United States Patent
Schroeder

(10) Patent No.: US 11,782,418 B2
(45) Date of Patent: Oct. 10, 2023

(54) METHOD FOR THE MODULAR ADJUSTMENT OF A PROGRAMMABLE CONTROLLER

(71) Applicant: Robert Bosch GmbH, Stuttgart (DE)

(72) Inventor: Thomas Schroeder, Urspringen (DE)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 17/091,464

(22) Filed: Nov. 6, 2020

(65) Prior Publication Data
US 2021/0141364 A1    May 13, 2021

(30) Foreign Application Priority Data

Nov. 13, 2019   (DE) ..................... 10 2019 217 520.1

(51) Int. Cl.
*G05B 19/4155*   (2006.01)
*G06F 8/36*   (2018.01)

(52) U.S. Cl.
CPC .......... *G05B 19/4155* (2013.01); *G06F 8/36* (2013.01); *G05B 2219/31229* (2013.01)

(58) Field of Classification Search
CPC .............................. G05B 19/4155; G06F 8/36
USPC .................................................. 717/140–155
See application file for complete search history.

(56) References Cited

U.S. PATENT DOCUMENTS

| | | | | |
|---|---|---|---|---|
| 5,603,043 A * | 2/1997 | Taylor | ..................... | G06F 30/34 716/132 |
| 5,768,287 A * | 6/1998 | Norman | ............. | G11C 16/3454 714/719 |
| 5,769,527 A * | 6/1998 | Taylor | ................ | G05B 19/0426 362/85 |
| 5,784,577 A * | 7/1998 | Jacobson | ............... | G11C 16/22 711/170 |
| 6,073,160 A * | 6/2000 | Grantham | ............... | H04L 63/08 709/200 |
| 6,397,379 B1 * | 5/2002 | Yates, Jr. | ............ | G06F 9/45554 717/140 |
| 6,402,031 B1 * | 6/2002 | Hall | ....................... | G06F 3/0317 235/400 |
| 6,438,738 B1 * | 8/2002 | Elayda | .................... | G06F 30/34 711/170 |
| 6,553,268 B1 * | 4/2003 | Schwenke | ............ | G05B 19/056 700/86 |

(Continued)

OTHER PUBLICATIONS

Estublier et al., "Preliminary Experience With a Configuration Control System for Modular Programs", ACM, pp. 149-156 (Year: 1984).*

(Continued)

*Primary Examiner* — Anil Khatri
(74) *Attorney, Agent, or Firm* — Maginot, Moore & Beck LLP

(57) ABSTRACT

The disclosure relates to a method for the modular adjustment of a programmable controller. A base run-time system is provided. Unambiguous references having a determined sequence are defined in the base run-time system. At least one function object is provided with one or several methods to be carried out and at least one function pointer to one or several of the methods. Each function pointer is linked to a defined unambiguous reference. At least one provided function object is executed on the basis of the linked unambiguous references.

11 Claims, 4 Drawing Sheets

(56) References Cited

U.S. PATENT DOCUMENTS

| | | | | |
|---|---|---|---|---|
| 7,191,433 | B2* | 3/2007 | Narad | H04L 49/9094 |
| | | | | 717/140 |
| 7,254,512 | B2* | 8/2007 | Odom | G16H 40/63 |
| | | | | 717/124 |
| 7,290,030 | B2* | 10/2007 | Edwards | G05B 19/00 |
| | | | | 709/203 |
| 7,721,273 | B1* | 5/2010 | Hall | G05B 19/056 |
| | | | | 717/149 |
| 8,743,543 | B2* | 6/2014 | Clidaras | H05K 7/1497 |
| | | | | 454/118 |
| 8,781,607 | B2* | 7/2014 | Chu | G05B 19/05 |
| | | | | 710/72 |
| 8,939,056 | B1* | 1/2015 | Neal, III | F42B 15/22 |
| | | | | 89/1.51 |
| 9,590,404 | B2* | 3/2017 | Bailey | H05K 7/1498 |
| 10,361,802 | B1* | 7/2019 | Hoffberg-Borghesani | |
| | | | | G06F 3/00 |
| 11,622,468 | B1* | 4/2023 | Welsko | H05K 7/1497 |
| | | | | 165/200 |
| 2004/0085982 | A1* | 5/2004 | Choi | H04W 28/14 |
| | | | | 370/412 |
| 2011/0320400 | A1* | 12/2011 | Namini | G06F 16/27 |
| | | | | 707/610 |
| 2012/0216726 | A1* | 8/2012 | Seibert | G07F 19/20 |
| | | | | 109/23 |
| 2014/0210401 | A1* | 7/2014 | Di Cristofaro | H02J 7/0025 |
| | | | | 320/137 |

OTHER PUBLICATIONS

Koutroulis et al, "Development of a Microcontroller-Based, Photovoltaic Maximum Power Point Tracking Control System", IEEE, pp. 46-54 (Year: 2001).*

Chouinard et al, Software for Next Generation Automation and Control:, IEEE, pp. 886-891 (Year: 2006).*

Jetley et al, "Applying Software Engineering Practices for Development of Industrial Automation Applications", IEEE, pp. 558-563 (Year: 2013).*

Hametner et al, "The Adaptation of Test-Driven Software Processes to Industrial Automation Engineering", IEEE, pp. 921-927 (Year: 2010).*

Kumar et al., "Source Code Metrics for Programmable Logic Controller (PLC) Ladder Diagram (LD) Visual Programming Language", ACM, pp. 15-21 (Year: 2016).*

\* cited by examiner

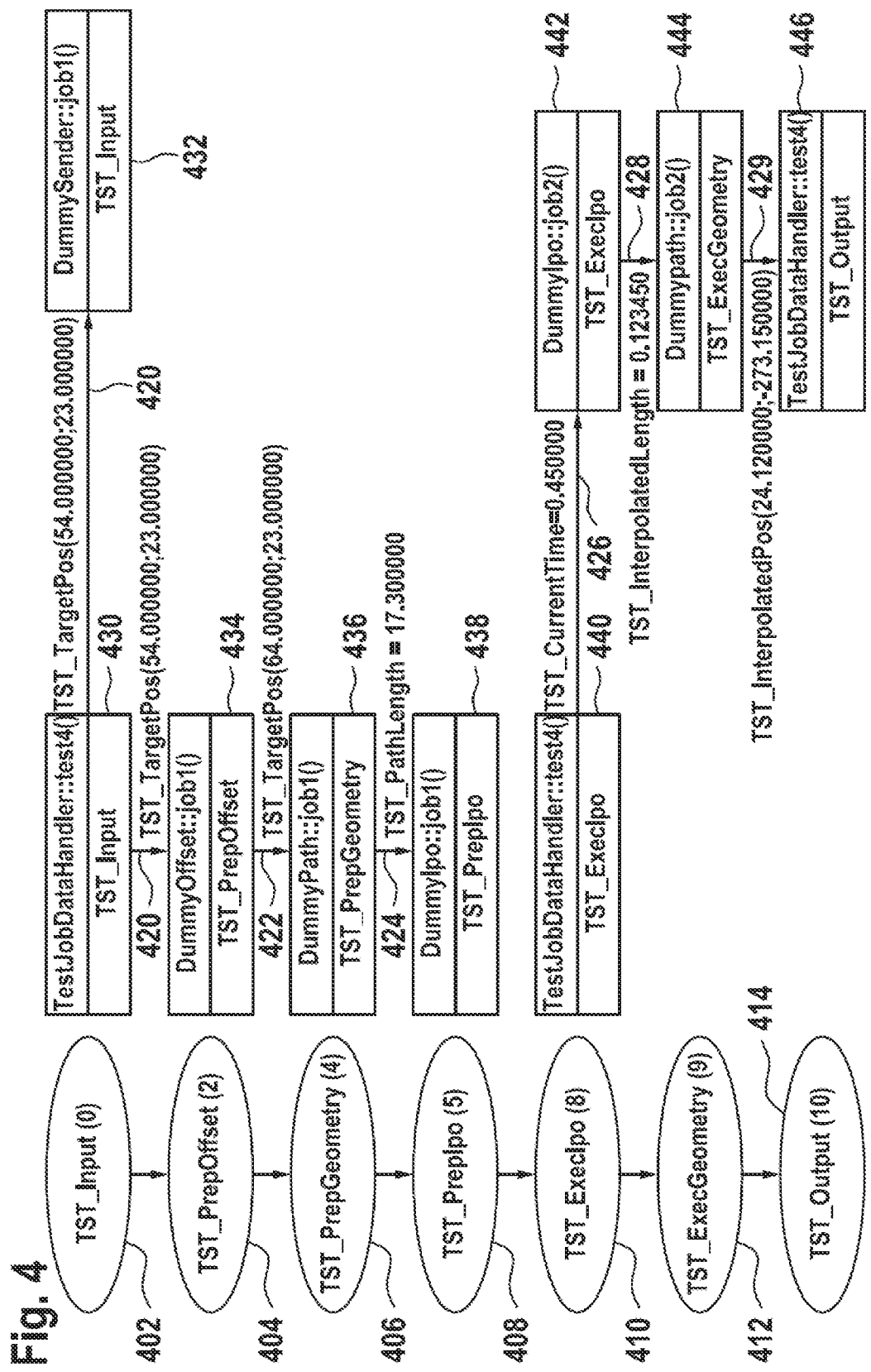

METHOD FOR THE MODULAR ADJUSTMENT OF A PROGRAMMABLE CONTROLLER

This application claims priority under 35 U.S.C. § 119 to application no. DE 10 2019 217 520.1, filed on Nov. 13, 2019 in Germany, the disclosure of which is incorporated herein by reference in its entirety.

TECHNICAL FIELD

The present disclosure relates to a method, a computer program, and a computation unit for the modular adjustment of a programmed controller.

BACKGROUND

In controllers for a wide variety of application fields, in particular in the field of automation controllers, computation sequences are generally firmly established in the architecture of the controller software. In such a structure, the user of the controller has highly limited access options. It is possible to some extent to modify results retroactively at individual points in the computation sequence, or to define additional functions of predefined elements; however, if these simple interventions are not sufficient, new firmware must be developed and created. Likewise, it is not possible to dispense with portions of the computation sequence which are not needed at all for local use. Shared data access in such systems is also limited for such potential interventions. All these characteristics make modular distribution of functionality or maintenance of the controller difficult.

SUMMARY

According to the present disclosure, a method for the real-time modular adjustment of a programmed controller is provided. Advantageous embodiments constitute the subject matter the following description.

In particular, a method is provided in which a base run-time system is initially provided, in which unambiguous references having a determined sequence are defined. Then, at least one function object is provided with one or several methods to be carried out and with at least one function pointer to one or several of the methods, wherein each function pointer is in turn linked to one of the defined unambiguous references of the base run-time system. Subsequently, at least one of the provided function objects is executed on the basis of the linked unambiguous references. Function objects in the form of encapsulated object classes can thus be used for executing program sequences in a controller, wherein the use of the unambiguous references (also referred to below as sections) ensures the execution of several function objects in the suitable sequence, without it being necessary for all function objects to be present or to be known previously. Any functions which are essential to the controller can be used as function objects, for example, various computations, transformations, or individual control commands.

In one embodiment, the method may furthermore comprise the registration of at least one new function object in the base run-time system, wherein the registration comprises the specification of the at least one function pointer and an unambiguous reference which is linked thereto, and the specification of data elements used by the function element. Thus, for example, additional functions which are developed later or developed by a customer or third-party provider can be added to the original base system modularly and at runtime (without restarting the controller system) and queued into existing program sequences, without it being necessary for the comprised function objects to be known initially. By means of the registration on the system, the additional function objects can be used by commands (in particular in programmable units).

According to exemplary embodiments, executable commands are formed from one or several of the registered function objects. The commands can be used to form complete sequence steps, for example, a particular motion sequence of an actuator, from the individual functions of the function objects. Commands can be predefined externally via suitable interfaces and can define the behavior of the controller and thus of the machine.

In addition, a data management module can be provided for a command, which manages an exchange of data elements between the function objects contained in the command, wherein the exchange of data elements comprises at least one of the following: providing at least one data element by means of a function object, reading at least one data element by means of a function object. The data management module allows the assignment and chronological classification of data accesses for any registered function objects in the command, and can also assume further tasks with respect to the data, for example, typification or type testing of the exchanged data.

When providing a data element by means of a function object, the data element can be linked to one of the defined unambiguous references in the run-time system, preferably to the reference in which the execution of the corresponding step (for example, a computation of the data element) takes place. Thus, data elements linked to an unambiguous reference can provide and be assigned to different computation states of data. Preferably, each data element can be provided at most once per reference, in order to enable an unambiguous assignment. However, a data element can be written a plurality of times, if each write access is assigned to a separate reference. Thus, it is possible to map different computation states of the data element.

Thus, for example, a commanded target position can be written in several sections: initially in a "CmdData" section, as exactly the values which were also provided to the command as parameters, subsequently in an "AbsPosition" section, wherein relative values were converted (and thus only absolute values are still stored in this section), and finally, in an "Offsets" section, wherein the absolute values are additionally modified by means of programmed offsets.

When reading a data element, reference can then in turn be made to one of the defined unambiguous references of the base run-time system. Thus, each reading function object can choose which of the computation states of a data element it would like to access. Optionally, when reading a data element, a target reference can be specified from the defined unambiguous references of the base run-time system, wherein the read data element then corresponds to a data element provided last before the target reference, so that unknown additional modifications before this target reference are also automatically included, without the function object having to know the previous steps.

In the example above, the function object can now choose whether it would like to get the commanded target position as original parameters (read "CmdData" section), as absolute values (read "AbsPosition" section), or as values after the offset (read "Offsets" section). If no offset is active, (and thus the "Offsets" section does not contain a data element), the data management module can automatically provide the data of the last section before the desired section (i.e., from the "AbsPosition" section). Thus, the reading function object does not have to know whether or not an offset is actually active.

According to further embodiments, at least one command parameter can be collected for a command, wherein the at least one command parameter can be invoked by methods of the function objects contained in the command. Command parameters can, for example, be transferred from a data management module to function objects as a data element, where they can then be used for the following execution steps.

In addition, it is possible to form command options from one or several of the function objects. Such a command option can then be activated, and it effectuates the addition of the one or several of the function objects of the command option to at least one subsequent command.

For example, a command option can be activated for a predefined number of subsequent commands or only for the next command; optionally, however, a command option could also be activated for all subsequent commands until a deactivation of the command option is invoked. Thus, individual functions can be flexibly activated and deactivated within a command without continually redeveloping the entire command.

An example of a command option is the above-described offset of the commanded target position. If this option is active, it adds a further step to the computation chain. If not, no runtime is used, and no memory is used. All other computation steps are completely independent of whether or not an offset is active.

In one embodiment, an extension can be added to the base system, wherein the extension comprises at least one of the following: one or several function objects, one or several commands, one or several command options. Thus, a base system can be flexibly extended at any point in time by the manufacturer, and can also be specifically customized to particular customer applications. The installation of an extension is preferably possible without a restart of the controller and can thus be implemented very easily and quickly. As soon as the extension has registered on the base system, the additional commands and command options are usable and can be invoked externally by means of suitable interfaces.

In further embodiments, a graphical user interface can be provided which makes it possible to display the provided function objects. A user input can then be collected which reproduces a selection of function objects, and an executable command can be formed from the selected function objects. Such a user interface makes it possible for a user to implement additional functionality and motion sequences of a controller in a simple manner, without having to take extensive development measures. The function objects which are used can again be parts of the original base system and/or can be added later by means of an extension.

Preferably, the function objects can form subfunctions for actuating, for example, one or several actuators, one or several sensors, one or several drives. While the basic principle of the modular extension of a controller by means of function objects is conceivable in practically any controllable system, it is possible to configure in particular controllers for automation systems, universal machines, processing centers, and other systems having, for example, memory-programmable controllers, to be extensible in this way.

A computation unit according to the present disclosure, for example, an automation controller, is configured, in particular in terms of programming, to carry out a method according to the present disclosure.

The implementation of a method according to the present disclosure in the form of a computer program or computer program product comprising programming code for executing all method steps is also advantageous, since this entails particularly low costs, in particular if an executing control unit is being used for other tasks and is therefore present in any case. Suitable data carriers for providing the computer program include in particular magnetic, optical, and electric memories, for example, hard drives, flash memories, EEPROMs, DVDs, etc. A download of a program via computer networks (Internet, Intranet, etc.) is also possible.

Additional advantages and embodiments of the present disclosure result from the description and the attached drawing.

It shall be understood that the aforementioned features and the features to be explained hereinafter are applicable not only in each specified combination, but also in other combinations or alone, without departing from the scope of the present disclosure.

BRIEF DESCRIPTION OF THE DRAWINGS

The present disclosure is schematically depicted in the drawing based on exemplary embodiments, and will be described in greater detail below with reference to the drawing.

FIG. 4 depicts an example of a visualized data flow when executing a command in different sections.

DETAILED DESCRIPTION

Figure 1:
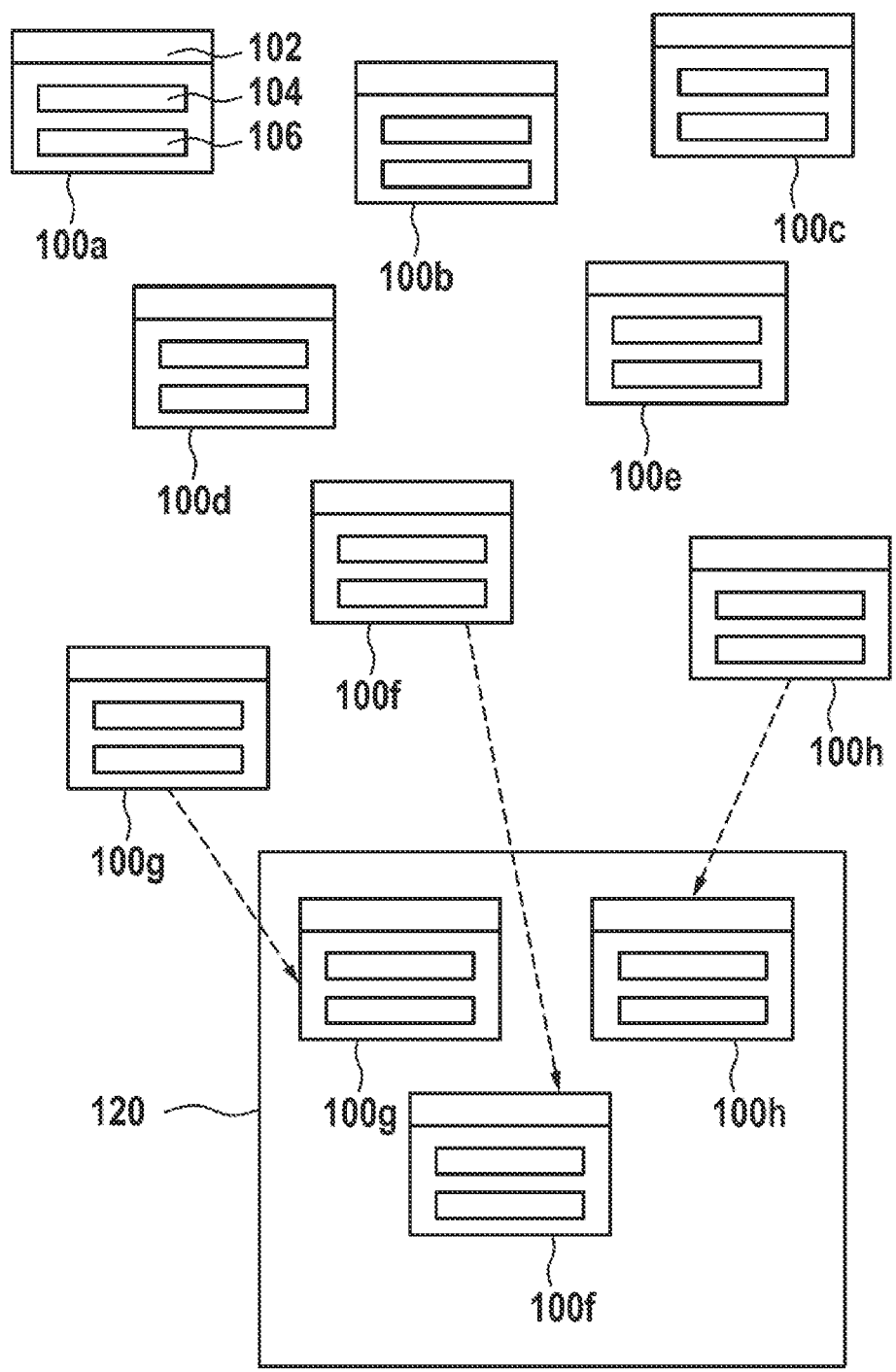
FIG. 1 depicts an example of the formation of a command from selected function objects.

FIG. 1 depicts an exemplary modular system for adjusting a programmable controller, according to embodiments of the present disclosure.

Firstly, the basic principle is a base system of a controller in the form of an embedded run-time system (embedded system), in which various standard functions can be implemented. For example, the functions concerned can be basic control functions of all kinds for an automation system. This run-time system can be provided as a unit.

For adjusting and extending this system, function objects 100 may now be provided, which may essentially be compiled object classes. For use in the run-time system, a function object should satisfy particular interfaces. A function object can either already be a part of the base system, and then be connected to the run-time system, or it can be included in an extension of the run-time system.

An extension can be present as a shared program library having predefined interfaces. When loading an extension, said extension can register on the run-time system, and it registers the additional functionalities which are included in it. Thus, an extension can be installed subsequently and can be both integrated by the manufacturer and developed and/or modularly integrated by the end user of the controller. Correspondingly, several extensions, for example, from different sources or at different points in time, can also be added to an existing system or can optionally also be removed again or modified.

A function object can also register on the run-time system during loading, and after this registration, it is preferably available in the entire system, for example, also for additional extensions. An unambiguous name 102 is assigned to each function object and is used for identification.

By means of function objects, any suitable individual functionalities of a controller can be implemented. Said functionalities can, for example, relate to particular computation steps or instructions for motions of an actuator or a machine axis. Both the functionality itself and the registration on the system takes place in this function object. Internal data 104 and methods 106 are available to each function object 100, and are available exclusively in the function object. These components are transmittable to any of the function objects 100*a*, 100*b*, ... 100*h* depicted in FIG. 1, wherein it is understood that each function object can comprise different data and/or methods. The internal methods and data can be read, written, and/or invoked by all subfunctions in the respective function object. However, they are preferably not accessible externally, i.e., the function objects are completely encapsulated. For outward data exchange, for example, with other function objects, a data management module and exits of the function objects via defined interfaces can be used, as will be described in greater detail below.

Based on the aforementioned example of a controller for an automation system or a processing machine, for example, the following may be provided as predefined or subsequently introduced function objects:

Geometric motion functions, for example, linear motion; circular motion; motion along cubic splines or B-splines;

One-dimensional interpolations, for example, an interpolator for generating a jerk-limited velocity profile having a trapezoid-shaped acceleration profile, or an interpolator based on a $\sin^2$ function;

Normalization and conversion functions, for example, metric measures, Anglo-American measures, conversions between coordinate systems such as polar coordinates, Cartesian coordinates, other reference systems;

Offsets, for example, zero-point offsets, tool offset, Helmert transformation;

Velocity interpolation with jerk limitation;

Collision detection, for example, one- or three-dimensional, having corresponding tolerances; position shift points;

Switching the drive mode, for example to location or velocity;

Events, for example, generation or maintenance;

Sensing probes;

Axis transformations;

Additional transformations, for example, cylinder jacket transformation, front face transformation;

Curves, chamfers, corner cuts;

Tool corrections;

Coupled axes, for example, Gantry, coupling via an electronic drive, flexible profile; compensations, and corrections.

It shall be understood that, depending on the actuated system and the desired functional scope, any other and/or further function objects may be used which are able to form corresponding modular components of a program sequence for control.

Preferably, function objects 100 are used in commands 120. A command can constitute a logical unit which represents a step in the execution of the application. Each command 120 can contain a predefined group of function objects 100*f*, 100*g*, 100*h* which implement the function of said command. The function objects which are used are determined during the development of the command. It is possible for the manufacturer to define commands and to provide them with the system. However, alternatively or in addition, commands can be defined modularly from function objects, for example, by a machine manufacturer or even by the end user. It is also possible that fully defined commands can be added subsequently, for example, within the scope of an extension of a function.

Examples of commands include motion sequences of an actuator, for example, the movement of the actuator of a robot along a straight line to a point in space; connecting power for a drive in an arbitrary device; deleting errors for an axis, and other sequences. Simpler or more complex functionalities can be implemented by means of a command, in that the function objects required therefor are determined therein. Generally, the commands preferably form the sequentially executing components of a control application which are executed sequentially by the run-time system.

For implementing such functionalities, a command can also contain parameters, for example, the target position of a motion. Command parameters can, for example, be incorporated into one or several function objects of a command as the value of a data element, and can correspondingly be used further, or can be used as a parameter setting for particular functions.

Commands can be specified externally via various conventional interfaces, for example, REST-API (Representational State Transfer Application Programming Interface); OPC Unified Architecture; PLC (programmable logic controller, for example, via functional components); Skript (for example, via an extension library in Python); low-level C interface, and others.

For the shared use of data within a command, a separate data management module can be assigned to each command. This data management module is used for exchanging data between the various function objects of a command. Since it is not necessary to know at the time of development which function objects exist in a command, said function objects cannot communicate directly with one another. The data management module can assume all functions such as type testing and data accesses of all kinds, for example, read, write and/or invoking accesses. In addition, the validity of the data elements (write first, then read) can be ensured via the data module.

In order to control the execution and accesses consistently in such a system, sections can be defined which are unambiguous references in the run-time system. For this purpose, each section can be identified via an unambiguous name or identifier. The sections have a defined sequence. Likewise, additional sections can also be defined and inserted into the existing sequence, for example, by means of a registered extension. When introducing new sections, they are made known and classified globally in the base system.

Some examples of sections in an exemplary controller of a machine tool include: inputting the command parameter, completing the geometry preparation, making the computed setpoint positions available. Of course, any further and other sections can be defined and can be used as suitable reference points for the executed function objects.

Furthermore, the function objects have defined interfaces. An exit is thus a function pointer to a method in a function object having a defined interface. Each function object can comprise any number of exits. When a command is incorporated into the system, all associated function objects are applied. Subsequently, each function object invokes an interface function which makes it possible to register exits in the run-time system.

For each exit of a function object, an associated section is to be defined in which the exit is to be invoked. By means of this fixed assignment of exits to sections having a defined sequence, the execution sequence of the exits is thus determined across all function objects, without the function objects themselves having to be known.

In addition, sections can be used to depict different processing states of data. For this purpose, when processing or writing, data are linked to a section, from which they are available. It is typically the section in which the exit or a method is running which computes the data. A function object can provide an existing data element further in a later section, wherein the original, initially provided data element preferably continues to remain available, i.e., it is not replaced. The combination of a data element (addressed via a data identifier) and a section constitutes the computation state of the data element.

Thus, the specification of the associated section is preferably required both for the provision of separate data by means of the interfaces via the data management module, and for the registration of a read access. The data flow can thereby be verified. The sequence of the sections can, for example, be determined automatically from the data flow, or can be explicitly defined via a configuration.

During read-out, data can then either be linked directly to a section or defined via a target section. In the case of fixed linking to a particular section, a different function object must write this data element exactly in this section, i.e., the exact data element is required in the specified section.

On the other hand, if a target section is defined, it is specified via this target section that the data element must be written up to this section.

Depending on the embodiment, one of these variants of the linking of data to sections can be predefined, or, for example, during the access, a suitable syntax can be used to differentiate between hard-linked data and data having a target section.

The use of a target section according to the second variant makes it possible to respond flexibly to additional function objects. If a function object queries a data element having a predefined target section, any other function objects may have modified the data element in previous sections.

Figure 2:
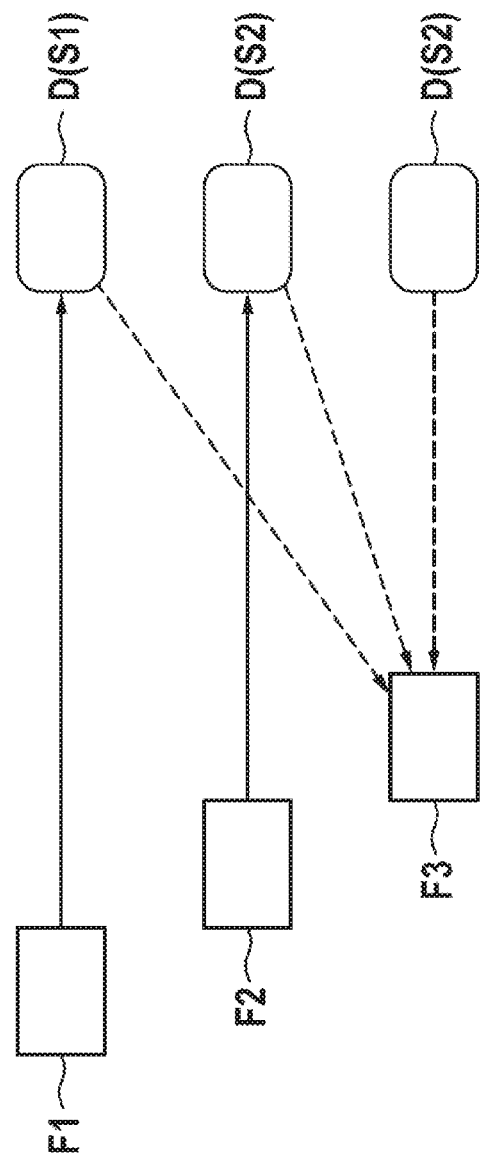
FIG. 2 schematically depicts data accesses by means of function objects in different sections.

An example of such an application in which data is linked to a target section is depicted in FIG. 2.

For example, sections S1, S2, S3 are defined, which, in this sequence, are predefined in the run-time system as references.

Furthermore, two function objects F1 and F2 are considered here. Function object 1 has an exit in section S1 and writes the data element D there. The function object F2 has an exit in section S2 and also writes the data element D there. Thus, two processing states of the data element D are provided in the system for the sections S1 and S2. A third function object F3 which runs in an exit in section S3 can now, for example, have read access to these data. For this purpose, the function object can specify whether it would like to read the data element D from the section S1, D(S1), and thus the result of the function object F1, or the data element D from the section S2 and thus the result of the function object F2. In another variant, instead of a fixed link, it could also be specified in the function object F3 that the last provided result of D before the target section S3 is to be read. This variant makes it possible that the last-written processing state of the data element is always read. In the present case, the function object F3 thus obtains the result of the function object F2 and thus the processing state D(S2), if it was executed or exists in the relevant command, and otherwise, it obtains the result of the function object F1, i.e., D(S1).

If data in a section are not modified, in one embodiment, they can respectively be bequeathed further to the following section, such that in the above example, the last-written data element D from section S2 can be bequeathed to section S3 and following sections, and can be read out in an access via this specification. Thus, a reading function can control the computation state which it would like to access via the desired section. Thus, for example, when reading a target position in a first section, the unmodified target position can be accessed, whereas when reading the same data element from a defined second section, the target position can be modified by an active zero-point offset. If the zero-point offset is not activated at all, the bequeathed data element of the first section can also be read from the second section. Thus, when accessing the target position of the second section, the function obtains the modified value if the offset is active, and the unmodified value if the offset is not active. A developer of the corresponding function does not have to take the zero-point offset into consideration, since both functionalities are decoupled in this way. The possibility of selective activation of individual function objects will be described below in greater detail.

A data exchange between exits or methods inside a function object does not require an access via the data management module, but rather can take place via private members of the function object.

Depending on the embodiment, other mechanisms can be used to ensure data communication. For example, it can preferably be determined that only one provision (publish) is allowed per section and data element, such that an unambiguous assignment is possible via the specification of the section.

Likewise, it can be determined that the write accesses must take place before the read accesses in each section, so that it is ensured that a function object which accesses the determined processing state of the data element also obtains the final result, which was possibly first provided in this section.

In addition, it can also be determined that write accesses take place in a protected manner and that writing is no longer possible.

According to one embodiment, in addition, strong type testing can be used, in particular for data which are exchanged between function objects. This means that, in addition to the underlying base data types of the respective languages which are used (for example, double, float, int, . . . ), additional data types can be defined in such a way that, for example, a target position can always be assigned only to a variable for target positions, and not to a variable for a velocity, although both can be based on the same base data type. Thus, preferably, additional, more specific data types are defined in the system and are then assigned to each data element. Thus, both the respective base data type and the specific data type are checked in order to ensure consistency of the data. The degree of differentiation can be chosen arbitrarily. The definition of specific data types simplifies the maintenance of the system and the extension options for the user.

According to one embodiment, a range of data types are predefined in the base system. Added extensions can then globally register new data types in the system globally, such that the new data types can be used by all function objects as of this point in time.

Figure 3:
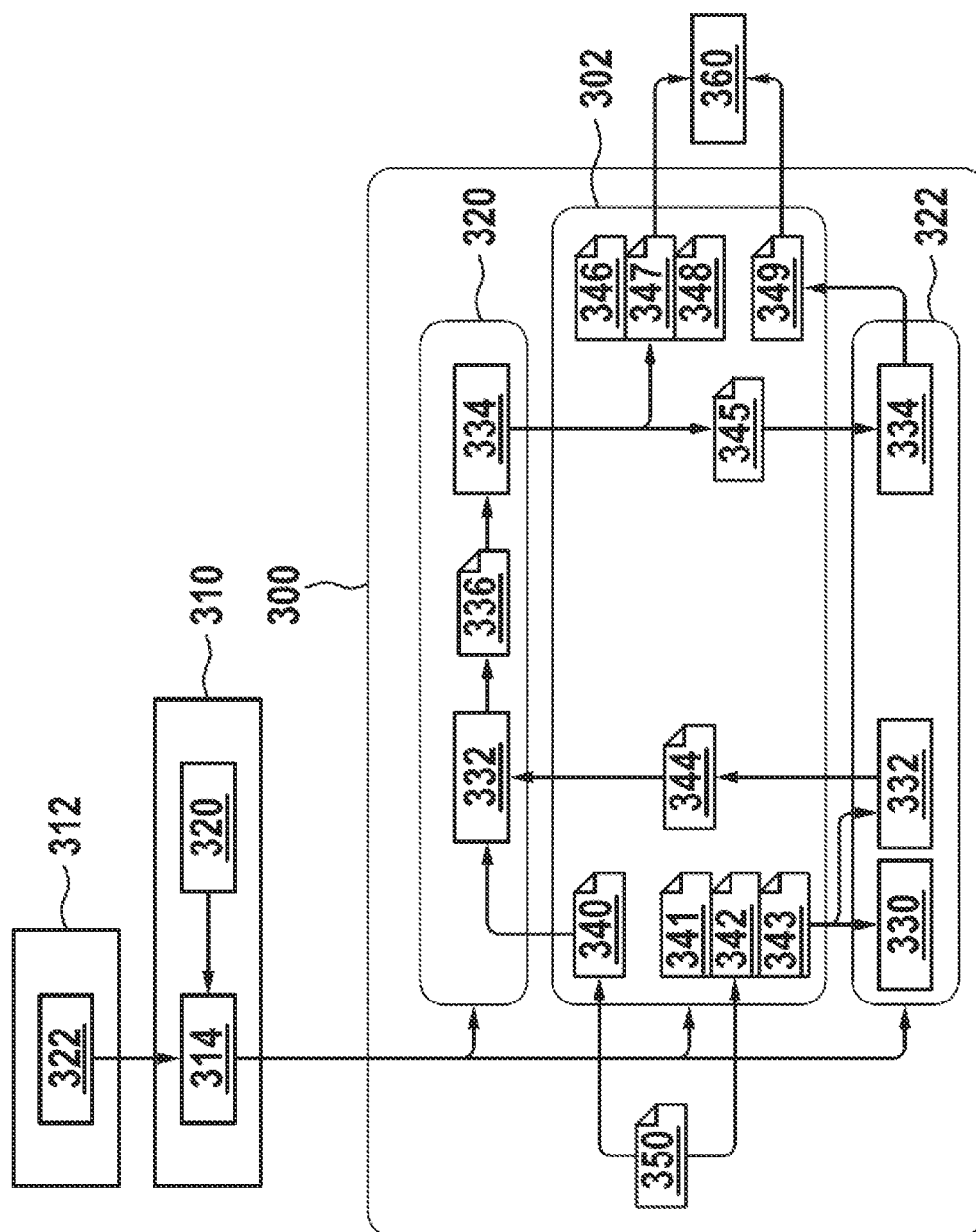
FIG. 3 depicts an exchange of data in a data management module between two function objects of a command, according to a possible embodiment.

FIG. 3 depicts an example of a schematic representation of a command having shared data management. Two function objects 320, 322 are used, of which one is already present in the base system 310, while the other can be added to the system by means of a post-installed extension 312. In the present case, said function objects may, for example, be function objects for a circular path 322 and a motion interpolation 312, which jointly form a command for a circular motion of an actuator. Both function objects can register on the base system, for example, on an object module 314, as depicted by the arrows from the function objects. A command 300 can then be formed which comprises these two registered function objects 320, 322. The associated data management module 302 of the command 300 is provided for managing the jointly used data.

The execution of the function objects is predefined by several sections having a fixed sequence, by allocating the exits of the function objects to the sections. In the present case, the sections 330a, 330b, 330c are, for example, assigned to the execution steps of a parameter validation (validate), data preparation (prepare), and execution (execute). The data used in the respective function objects are exchanged via the data management module 302. Here, dynamic limit values, target position, auxiliary position, path lengths, and others which can be used as input variables, are depicted as conceivable data for the example of the circular motion. They can, for example, be fixedly predefined or can be incorporated as a command parameter 350 into the data which is used. It is then apparent that the two function objects execute corresponding to the fixed sections, and read or provide data in individual sections, which are then in turn used further by one of the function objects in other exits. For example, in a first section 330a, the data for positions and direction are initially validated in the circular path function object 322, while these and other data are prepared in the next section 330b. In each section, corresponding methods execute in the function objects. As is also apparent, data 344 written by a function object 322 (for example, a path length computed by the function object) can also be provided in a section and invoked again in the same section by a different function object. This is made possible by preferably predefining that all write accesses take place before the read accesses.

Subsequently, in the function object 320, an internal data transfer is depicted between the sections 332 and 334, into which the data management module is not integrated. However, at this point in time, no internal data are transferred between the sections in the function object 322. Instead, in the following section 334 for execution, the function object 322 requests a one-dimensional length 345 which was previously provided by means of execution of the first function object 320 in the same section 334. In addition, both function objects provide other generated data 346, 347, 348, 349, which together then provide the motion sequence to an actuator. Said data may, for example, concern a velocity 346, an acceleration 347, a jerk (i.e., derivative of the acceleration) 348, or a setting position 349.

Of course, commands can also comprise considerably more function objects and more complex interactions via the data management module. However, a command can also comprise a single function object.

In further embodiments, command options can be implemented. A command option is a logical unit which modifies a command Preferably, a command option also internally comprises one or several predefined function objects which implement its function. A command option can also be implemented by exactly one function object. Command options can generally be predefined via the same interfaces as commands (REST, OPC-UA, SPS, Skript, Low-Level C).

Optionally, command options can also comprise parameters, for example, the provided offset as a parameter value for a tool offset. If a command option is predefined which is already currently active, the new option can overwrite the existing option with the specified parameters, such that the parameters of a command option can be adjusted in this way.

In the example case of a machine controller, possible examples of command options include, for example, axis transformations, tool offsets, or functions for smoothing two motion commands into one another. Generally, any function object or any group of function objects can be used as a command option.

A command option can be permanently activated, i.e., until it is again explicitly deactivated, for example, by a corresponding command. Likewise, a command option can also be valid specifically only for the next command or for a predefined number of subsequent commands.

As long as a command option is activated, it can generate instances of its function objects in all subsequent commands. In this way, commands can be flexibly modified, and corresponding functionalities can be temporarily activated and deactivated. If a command enters the system, all function objects belonging to the command, and the function objects of all command options which are currently active, are stored and added to the command.

According to one embodiment, the above-described modular structure can be used to enable an end user or customer to set up additional commands and/or command options independently. For the additional commands, it is possible merely to access the function objects provided by the manufacturer in the base system; however, other function objects can also be developed in a targeted manner, in particular by means of an extension, or included in the system as a finished extension for specific application purposes. After the new function objects are registered in the run-time system, they can be used for forming new commands and/or command options. It is not necessary to restart the entire controller; a system reset is sufficient and provides a significantly faster option for adjusting the controller.

In one embodiment, a particular function object can be provided by the manufacturer, for example, a 1D-velocity interpolator for a jerk-limited velocity control. This function object can in turn be used in a command "motion of the actuator of a robot along a straight line to a point in space" which is also already present in the base system. Additional functions or modifications can now be requested by the user, for example, if the target position is to be approached on a particular spline path. For this purpose, a further function object can then be developed which implements the path interpolation via the spline. Subsequently, a new command can be created which comprises both the original function object with the 1D-velocity interpolator and the function object for the spline path. The additional function object, the newly created command, and some registration functions can then be combined into an installable library or extension. As soon as this extension is installed on a controller, the new command is available there and can be executed, preferably after a system reset.

As a further exemplary embodiment, a combination of functions created by the manufacturer with subsequently extended functions by means of a command option will be described. At the request of a user, for example, a particular compensation function is to be provided which is not available in the existing base system. For this purpose, a corresponding "compensation" function object can first be implemented which could be developed specifically by the user, or which can also be provided in finished form by a supplier. The function object is then used to form a command option. The command option having the associated function object is then introduced into an extension which can be installed or registered in the base system. After the successful registration and preferably a system reset, the new command option can be invoked.

In the following steps, firstly, the "compensation" command option can now be permanently activated, such that it remains active until an active disconnection of the option takes place. Next, a first motion command for a linear motion is invoked. All function objects which belong to this first motion command are now instantiated in a first command Since the command option is active, in addition, the function objects of the command option are additionally instantiated in the first command Subsequently, all function objects of the first command are executed according to their sections, and in each cycle, a setpoint position is computed which is modified and then output by the "compensation" function object.

Next, a second motion command for a circular motion is executed. If the command option is still active, the steps as in the first command are also executed for this second command, i.e., the instantiation of all function objects of the second motion command, as well as the function objects of the command option and the output of the correspondingly modified positions.

However, if a deactivation of the command option was carried out before the second motion command, the second command is instantiated without the function objects of the command option, and non-modified setpoint positions are again output. Thus, an additional function which is contained in a command option can be activated and deactivated arbitrarily in other commands. If the command option has not been permanently activated, but only, for example, for a single subsequent command, no deactivation is subsequently required, and all further commands are again executed unmodified.

According to one embodiment, different parts of the aforementioned embodiments can be visualized for a developer or end user of such a controller, or can be depicted in another manner in a user interface. For example, for generating commands/command options from function objects, graphical depictions can be used which, like in FIG. 1, display the function objects which are available for selection as block elements on a display, and depict a modular structure of a command, for example, by moving the required function objects into a command Internal function objects added, for example, by means of extensions, can also be integrated arbitrarily. However, of course, a different depiction method for a suitable user interface is also conceivable, for example, an option for combining suitable commands and options which is text-based or which is predefined based on a tree structure.

Likewise, the data flow, which, for example, runs based on an executed command, can be visualized for a user via a suitable user interface, for example, as a directional graph as depicted in the example in FIG. 4, or in another manner. Thus, the computation sequence can be reproduced via the different function objects, which can simplify in particular the development and adjustment of the system components.

FIG. 4 depicts a visualization of a data flow which can take place in an exemplary embodiment. On the left side, the sections 402, 404, 406, 408, 410, 412, 414 of the time sequence are listed from top to bottom. Four function objects are present in the instantiated command of this example, wherein a portion of the function objects can also originate from one or several command options. The access steps on the right side of the figure respectively specify the function object and the exit it uses in upper half, while the linked section is specified in the lower half. The arrows between the steps also indicate the transfer of data elements or parameter values.

In a first phase, the data and parameters are prepared.

1. In the first section TST_Input, 402, in step 430, the command parameter 420, TST_TargetPos, having the content {54;23}, is provided by the system, i.e., by the data management module of the command.

2. In step 432, the exit job1 of the first function object DummySender uses the data element 420 (TST_TargetPos) from this section 402. The steps 430 and 432 are both executed in the same section 402.

3. In the following section 404 (TST_PrepOffset), in step 434, the exit of the second function object DummyOffset reads the data element 420 (TST_TargetPos), modifies it, and re-writes the data element as a modified element 422 having its new value {64;43}.

4. In the section 406, TST_PrepGeometry, in step 436, the exit job1 of the third function object DummyPath now uses this modified target position 422, computes the path length (17.3), and provides it as TST_PathLength 424. The section 406, TST_PrepGeometry, was specified as the target section. The function object can store additional data in internal variables; however, said data are not generally provided.

5. At the conclusion of the preparation, in section 408, the exit job1 is again called by the fourth function object DummyIpo, access step 438. It uses the previously computed path length TST_PathLength 424. The exit pre-computes a velocity profile and stores the associated data internally, but does not make said data generally available.

In the following phase, the further computations and data manipulations for the final output of the command are carried out.

6. In the section 410, TST_ExecIpo, the run-time system provides the current time stamp 426 TST_CurrentTime with the value (0.45).

7. This time stamp 426 is also used in the section 410 by the exit 442, job2 of the fourth function object DummyIpo. On the basis of the data computed in exit 438, job1 and the current time 426, an interpolated length 428 TST_InterpolatedLength (0.123456) is determined and published.

8. The exit job2 of the function object DummyPath is finally called in section 412, TST_ExecGeometry, uses the interpolated length 428 TST_InterpolatedLength, and in step 444, computes the interpolated position 429 TST_InterpolatedPos {24.21;−273.15} from it and using its internal data, and provides it in the system.

9. Since no further exits are registered, in section 414, the system can finally read out the computed finished setpoint position and send it to the drives in step 446 TST_Output.

It shall be understood that the exemplary embodiments above were used only to illustrate various basic principles of the present disclosure separately, and that they can be extended, modified, and combined in any arbitrary manner. In particular, for example, command options may also be used as described in all examples which relate to the use of commands; any new function objects and further sections can be registered; described data elements and sequences can be replaced by others, adjusted to the respective technical application; in all examples, fewer or more function objects, commands, data elements, etc. can be used than were used here for the description.

What is claimed is:

1. A method for real-time modular adjustment of a programmable controller, the programmable controller being configured to operate a machine, the method comprising:
providing a base run-time system of the programmable controller;
defining unambiguous references having a determined sequence in the base run-time system;
providing at least two function objects, each of the at least two function objects including at least one process to be carried out and at least one function pointer to the at least one process, each of the at least one function pointer being linked to one of the defined unambiguous references;
forming an executable command from the at least two function objects;
providing a data management module for the executable command, the data management module being configured to manage an exchange of data elements between the at least two function objects contained in the executable command using the defined unambiguous references of the base run-time system,
the exchange of data elements including (i) providing at least one data element with one of the at least two function objects and (ii) reading at least one data element with one of the at least two function objects,
the providing the at least one data element including linking the at least one data element to at least one of the defined unambiguous references of the base run-time system, the reading the at least one data element including invoking the at least one data element with a target reference from the defined unambiguous references of the base run-time system, the at least one data element that is read corresponding to a data element provided last before the target reference; and
executing the executable command to operate the machine, the at least two function objects being executed based on the linked unambiguous references.

2. The method according to claim 1 further comprising:
registering at least one new function object in the base run-time system by (i) specifying at least one new function pointer that is linked to one of the defined unambiguous references, and (ii) specifying data elements used by the at least one new function object.

3. The method according to claim 1, the reading the at least one data element further comprising:
invoking the at least one data element to refer to one of the defined unambiguous references of the base run-time system.

4. The method according to claim 1 further comprising:
collecting at least one command parameter for the executable command, wherein the at least one command parameter can be invoked by processes of the at least two function objects contained in the executable command.

5. The method according to claim 1 further comprising:
forming a command option from the at least two function objects;
activating the command option; and
adding the at least two function objects the command option to a subsequent command.

6. The method according to claim 5, the activating comprising one of:
activating the command option for a predefined number of subsequent commands; and
activating the command option for all subsequent commands, until a deactivation of the command option is invoked.

7. The method according to claim 1 further comprising:
adding an extension to the base run-time system, the extension including at least one of (i) at least one further function object, (ii) at least one command, and (iii) at least one command option.

8. The method according to claim 1 further comprising:
providing a graphical user interface;
displaying the at least two function objects;
collecting an input which reproduces a selection of at least two function objects; and
forming an executable command according to the collected input.

9. The method according to claim 1, wherein the method is performed by a computation unit that executes a computer program.

10. The method according to claim 9, wherein the computer program is stored on a non-transitory machine-readable storage medium.

11. A computation unit for real-time modular adjustment of a programmable controller, the programmable controller being configured to operate a machine, the computation unit configured to:
provide a base run-time system of the programmable controller;
define unambiguous references having a determined sequence in the base run-time system;
provide at least two function objects, each of the at least two function objects including at least one process to be carried out and at least one function pointer to the at least one process, each of the at least one function pointer being linked to one of the defined unambiguous references;
form an executable command from the at least two function objects;
provide a data management module for the executable command, the data management module being configured to manage an exchange of data elements between the at least two function objects contained in the executable command using the defined unambiguous references of the base run-time system, the exchange of data elements including (i) providing at least one data element with one of the at least two function objects and (ii) reading at least one data element with one of the at least two function objects,
the providing the at least one data element including linking the at least one data element to at least one of the defined unambiguous references of the base run-time system, the reading the at least one data element including invoking the at least one data element with a target reference from the defined unambiguous references of the base run-time system, the at least one data element that is read corresponding to a data element provided last before the target reference; and
execute the executable command to operate the machine the at least two function objects being executed based on the linked unambiguous references.

* * * * *